US008447362B2

(12) United States Patent
Takeoka et al.

(10) Patent No.: US 8,447,362 B2
(45) Date of Patent: May 21, 2013

(54) FUNCTION UPDATING SYSTEM AND FUNCTION UPDATING METHOD

(75) Inventors: Masanori Takeoka, Tokyo (JP); Nobuchika Taniguchi, Ichikawa (JP)

(73) Assignee: NTT DoCoMo, Inc., Tokyo (JP)

( * ) Notice: Subject to any disclaimer, the term of this patent is extended or adjusted under 35 U.S.C. 154(b) by 699 days.

(21) Appl. No.: 12/443,915

(22) PCT Filed: Oct. 3, 2007

(86) PCT No.: PCT/JP2007/069360
§ 371 (c)(1),
(2), (4) Date: Mar. 9, 2010

(87) PCT Pub. No.: WO2008/044570
PCT Pub. Date: Apr. 17, 2008

(65) Prior Publication Data
US 2011/0053573 A1    Mar. 3, 2011

(30) Foreign Application Priority Data
Oct. 5, 2006   (JP) ................................. 2006-274201

(51) Int. Cl.
*H04M 1/00*   (2006.01)
*H04M 3/42*   (2006.01)

(52) U.S. Cl.
USPC ......................................... 455/566; 455/415

(58) Field of Classification Search
USPC ................................ 455/566, 415
See application file for complete search history.

(56) References Cited

U.S. PATENT DOCUMENTS
6,515,695 B1   2/2003  Sato et al.
2005/0027716 A1*  2/2005  Apfel ........................... 707/100
2006/0030368 A1   2/2006  Soelberg
2010/0017470 A1*  1/2010  Hyoung et al. ............... 709/204

FOREIGN PATENT DOCUMENTS
| EP | 1503604 A2 | 7/2004 |
| EP | 1791334 A1 | 5/2007 |
| JP | 2001290789 A | 10/2001 |
| JP | 2002051121 A | 2/2002 |
| JP | 2002247182 | 8/2002 |
| JP | 2006230612 A | 9/2006 |
| WO | 2005027481 A1 | 3/2005 |
| WO | 2006052176 A1 | 5/2006 |

OTHER PUBLICATIONS

Supplemental European Search Report; Application No. 07829099.6-2414; Date Mailed Sep. 14, 2011.
International Search Report; International Application No. PCT/JP2007/069360; Mailing Date Nov. 6, 2007.

* cited by examiner

*Primary Examiner* — Marisol Figueroa
(74) *Attorney, Agent, or Firm* — MKG, LLC

(57) ABSTRACT

A function updating system and function updating method enabling a user to recognize what functions are installed in a mobile terminal of a communicating party, by automatically notifying the functions in the mobile terminal and updating the address book with the functions. When a mobile terminal (1A) makes a call to another mobile terminal (1B), the mobile terminal (1A) transmits information of functions available in the mobile terminal (1A) to a function notifying server (31), the function notifying server (31) generates icon information based on the function information, and transmits the icon information to the mobile terminal (1B), and the mobile terminal (1B) updates the address book with the icon information. When the mobile terminal (1B) does not have an icon corresponding to the updated function, the mobile terminal (1B) downloads the icon from an icon server (32).

4 Claims, 8 Drawing Sheets

| FUNCTION / TERMINAL | VIDEOPHONE | DECO-MAIL | PUSH TALK | CHAKU-MOJI |
|---|---|---|---|---|
| F902is | ◯ | ◯ | ◯ | ◯ |
| S0902i | ◯ | ◯ | × | × |

| DISPLAY POSITION ID | 1 | 2 | 3 | 4 |
|---|---|---|---|---|
| ICON ID | A | B | C | — |
| AVAILABILITY ID | 1 | 1 | 0 | — |

| ICON ID | A | B | C | D |
|---|---|---|---|---|
| ICON | 📱 | DECO ✉ | Push Talk! | — |

| DISPLAY POSITION ID | 1 | 2 | 3 | 4 |
|---|---|---|---|---|
| ICON ID | A | B | C | — |
| AVAILABILITY ID | 1 | 1 | 0 | — |

FIG. 10(a)

| DISPLAY POSITION ID | 1 | 2 | 3 | 4 |
|---|---|---|---|---|
| ICON ID | A | B | C | D |
| AVAILABILITY ID | 1 | 1 | 1 | 1 |

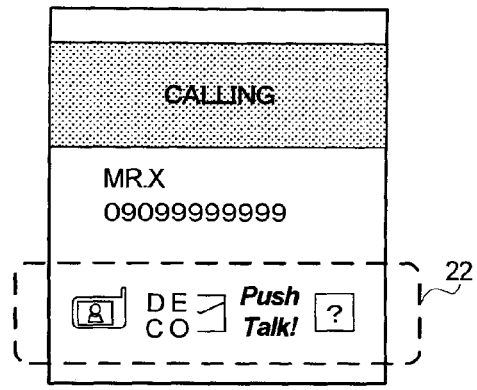
FIG. 10(b)
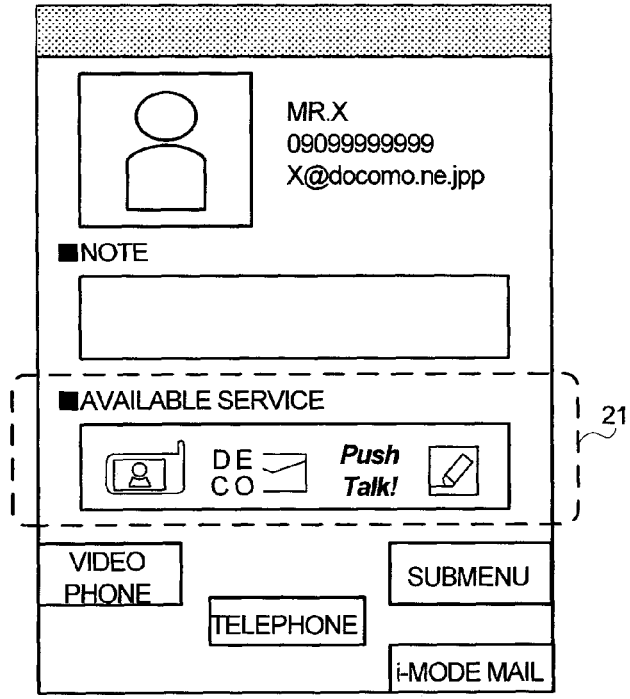
FIG. 10(c)
FIG. 10(d)

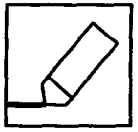
FIG. 11(a)
| DISPLAY POSITION ID | 0 | 1 | 2 | 3 | 4 |
|---|---|---|---|---|---|
| ICON ID | A | B | C | D | E |
| AVAILABILITY ID | — | 1 | 1 | 1 | 0 |
FIG. 11(b)
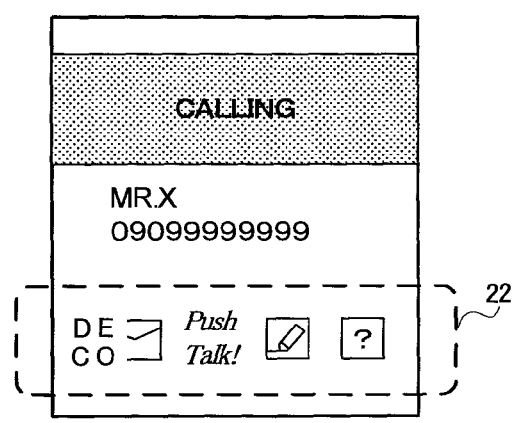
FIG. 11(c)

FUNCTION UPDATING SYSTEM AND FUNCTION UPDATING METHOD

TECHNICAL FIELD

The present invention relates to a function updating system and function updating method of mobile terminals.

BACKGROUND

Conventionally, systems have been considered that enable a telephone number to be updated with ease when the telephone number is changed such as when the model of the mobile terminal, such as a cellular telephone, is changed. For example, Patent Document 1 discloses making various settings to automatically notify, at a set time, parties identified by a user, via a text message regarding the change of telephone number, displaying a confirmation of the text message notifying the desired partner of the change of telephone number. According to this system, the user is capable of notifying a plurality of communicating parties of a change of telephone number of the user without needing burdensome operation.
[Patent Document 1] Japanese Laid-Open Patent Publication No. 2002-247182

DISCLOSURE OF INVENTION

In recent years, mobile terminals include various functions, and therefore are able to make a call to a communicating party using the variety of functions. However, no means exist to determine what functions are installed in a mobile terminal of a communicating party, and further, when the model of mobile terminal is changed, there is no information to know what functions are installed in the mobile terminal.

SUMMARY OF THE INVENTION

It is an object of present the invention to provide a function updating system and function updating method enabling a user to recognize what functions are installed in a mobile terminal of a communicating party, by being automatically notified of the functions in the mobile terminal and updating the user's address book with these functions.

A function updating system of the present invention is provided with a mobile terminal apparatus having communication control means for transmitting information regarding the functions available that are in the mobile terminal apparatus. The function updating system further includes updating means for updating an address book with information regarding the available functions in an apparatus of a communicating party, and a server apparatus having information generating means for generating function display image information based on the information of functions, and communication control means for transmitting the function display image information to the mobile terminal apparatus. According to this embodiment, it is possible to get a user to recognize what functions are installed in the mobile terminal of the communicating party, by notifying the functions in the mobile terminal and updating the address book with the functions.

In the function updating system of the invention, it is preferred that the system further has a function display image server apparatus that manages various function display images, and that the communication control means of the mobile terminal apparatus downloads a function display image corresponding to a function updated in the address book from the function display image server apparatus when the mobile terminal apparatus does not have the function display image corresponding to the function updated in the address book.

In the function updating system of the invention, the information generating means preferably has the function of deleting a function display image, while including information of the deleted function in the function display image information. According to this constitution, it is possible to replace an icon of the function established in the user with an icon of a new function for a service provider to wish to advertise, and to effectively use an area for storing icons. Further, it is possible to leave the history of function display regarding the mobile terminal of each user, and the need is eliminated for managing the function display on each service provider side.

A function updating method of the invention has the steps of transmitting information regarding available functions in a first mobile terminal apparatus to a server apparatus when the first mobile terminal apparatus makes a call to a second mobile terminal apparatus, generating in the server apparatus function display image information based on the information of functions, transmitting in the server apparatus the function display image information to the second mobile terminal apparatus, and updating in the second mobile terminal apparatus an address book with the function display image information.

According to this method, it is possible to get a user to recognize what functions are installed in the mobile terminal of the communicating party, by notifying the functions in the mobile terminal and updating the address book with the functions.

In the function updating method of the invention, it is preferred that the second mobile terminal apparatus further has the step of making a request for download of a function display image corresponding to a function that has been updated in the address book to a function display image server apparatus when the second mobile terminal apparatus does not have the function display image corresponding to the function updated in the address book, and that the server apparatus downloads the function display image corresponding to the function updated in second mobile terminal apparatus in response to the request.

In the function updating method of the invention, in the step of generating the function display image information, it is preferable to delete a function display image, while including information of the deleted function in the function display image information. According to this method, it is possible to replace an icon of the function established in the user with an icon of a new function for a service provider to wish to advertise, and to effectively use an area for storing icons. Further, it is possible to leave the history of function display regarding the mobile terminal of each user, and the need is eliminated for managing the function display on each service provider side.

BRIEF DESCRIPTION OF DRAWINGS

FIGS. 10(*a*) to 10(*d*) are diagrams to explain icon download in the function updating method according to the embodiment of the invention; and FIGS. 11(*a*) to 11(*c*) are diagrams to explain deletion of an unnecessary icon and addition of a new icon in the function updating method according to the embodiment of the invention.

BEST MODE FOR CARRYING OUT THE INVENTION

An embodiment of the invention will specifically be described below with reference to accompanying drawings.

Figure 1:
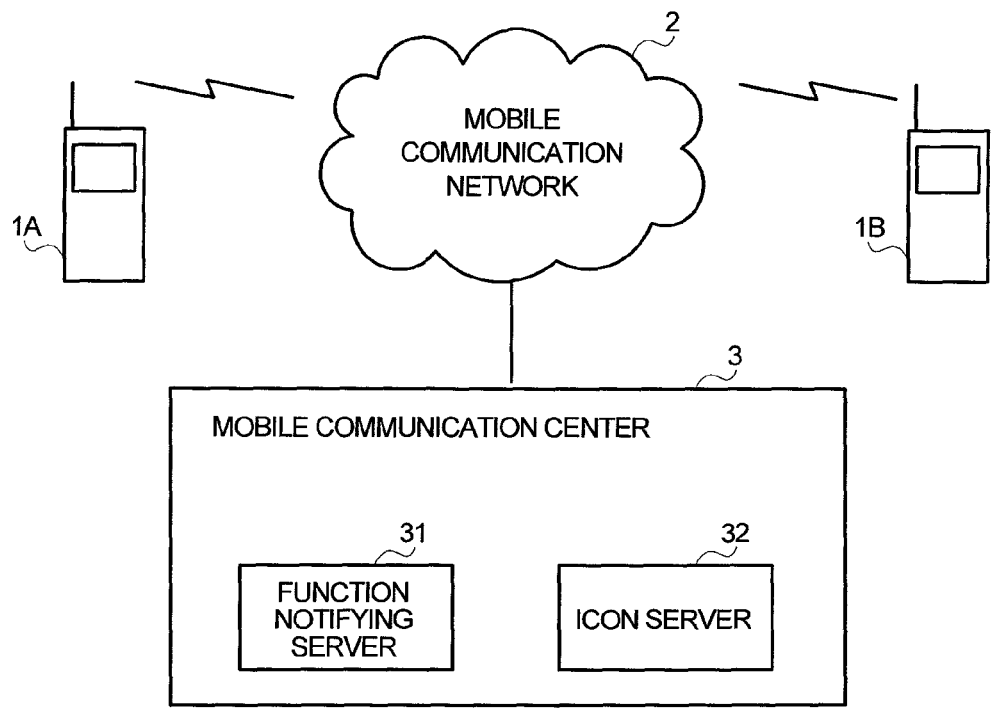
FIG. 1 is a diagram showing a schematic configuration of a function updating system according to an embodiment of the invention.

FIG. 1 is a diagram showing a function updating system according to an embodiment of the invention. The system as shown in FIG. 1 is mainly comprised of mobile terminals 1A, 1B, and mobile communication center 3 connected to the mobile terminals 1A, 1B via a mobile communication network 2.

Described herein is the case where the mobile terminal 1A makes a call to the mobile terminal 1B, and the functions of the mobile terminal 1A are updated in an address book of the mobile terminal 1B. Further, each of the mobile terminals 1A, 1B has an operating system (mobile-apparatus OS), and the browser function, viewer function, JAM (Java (registered trademark) Application Manager), and other functions operate on the mobile-apparatus OS.

The mobile communication network 2 is a network between the mobile terminals 1A, 1B and mobile communication center 3. The mobile communication network 2 includes a mobile packet communication network in addition to the ordinary mobile communication network. Meanwhile, the mobile communication center 3 has, for example, an i-mode (registered trademark) server and the like, while performing the gateway function for connecting between the mobile communication network 2 and the Internet, and specifically, has the information distribution function, e-mail transmission reception function, e-mail storage function, contract client management function, information provider management function, and information fee billing function.

The mobile communication center 3 generates function display image information (icon information) based on information of functions of the mobile terminal 1A (information (function information) of the functions installed in the mobile terminal 1A), and has a function notifying server 31 that transmits the icon information to the mobile terminal 1B, and icon server 32 that manages various function display images (icons). In addition, herein, the function notifying server 31 and icon server 32 are separately constructed, but the function notifying server 31 and icon server 32 may be integrally constructed.

Figure 2:
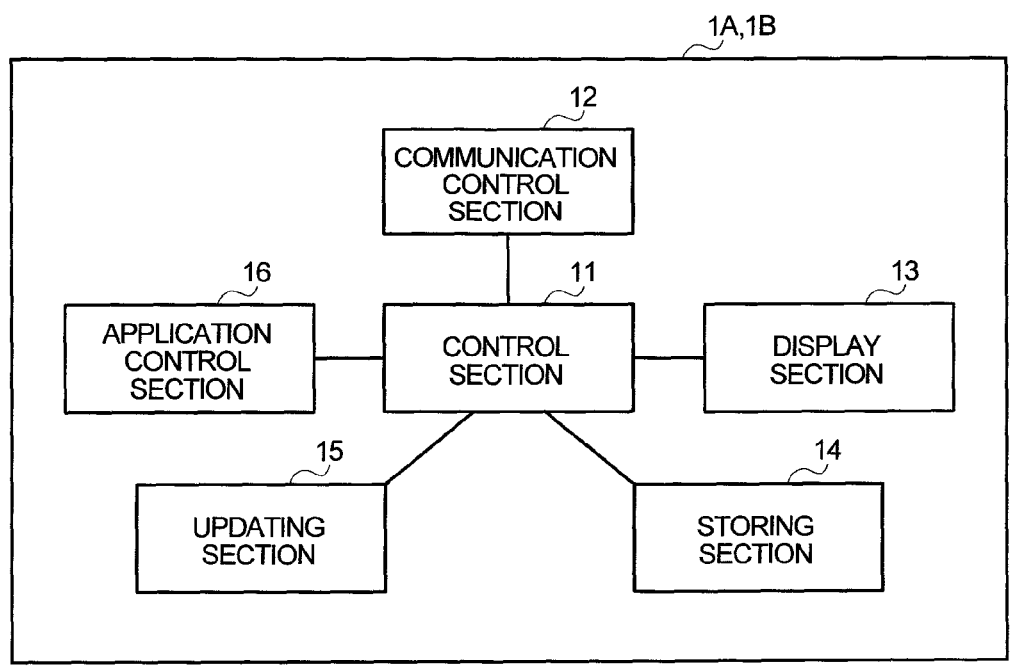
FIG. 2 is a block diagram showing a schematic configuration of a mobile terminal in the function updating system as shown in FIG. 1.

FIG. 2 is a block diagram showing a schematic configuration of the mobile terminals 1A, 1B as shown in FIG. 1. In addition, the configuration as shown in FIG. 2 is simplified to explain the invention, and is assumed to have components installed in an ordinary mobile terminal.

Each of the mobile terminals 1A, 1B is mainly comprised of a control section 11 that controls the entire apparatus, communication control section 12 that communicates with the function notifying server 31 and icon server 32 via the mobile communication network 2, display section 13 that displays various kinds of data and information, storing section 14 that stores various kinds of data including an address book, updating section 15 that updates data registered with the address book based on the information of functions of the mobile terminal, and application control section 16 that starts various applications installed or downloaded in the apparatus.

The communication control section 12 transmits information of functions available in the terminal to the function notifying server 31 in calling. Meanwhile, when the terminal does not have an icon corresponding to a function updated in the address book, the communication control section 12 requests download of the icon corresponding to the function updated in the address book to the icon server 32. Further, the communication control section 12 receives the icon downloaded from the icon server 32.

The storing section 14 stores the address book with which is registered personal information such as telephone numbers, e-mail addresses and the like of communicating parties. Further, functions available in mobile terminals of communicating parties are also registered with the address book.

Figures 3, 4, 5:
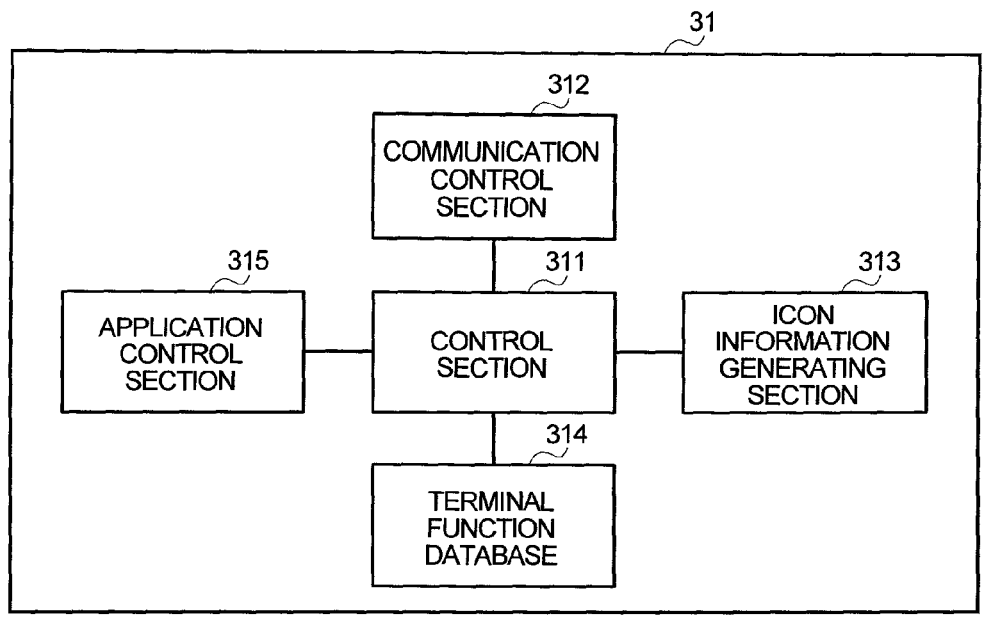
FIG. 3 is a block diagram showing a schematic configuration of a function notifying server in the function updating system as shown in FIG. 1.
FIG. 4 is diagram showing a management table associating a model of mobile terminal with functions.
FIG. 5 is a diagram to explain icon information indicating display positions and display forms of icons.

The updating section 15 updates the address book based on the function information transmitted from the function notifying server 31. More specifically, the function information transmitted from the function notifying server 31 is, for example, information as shown in FIG. 5, and the updating section 15 displays a predetermined icon in a predetermined position in a predetermined form according to the function information. In other words, the updating section 15 updates the address book so as to display an icon of the icon ID "A" in a display position "1" of the address book, display an icon of the icon ID "B" in a display position "2" of the address book, and display an icon of the icon ID "C" in a display position "3" of the address book. At this point, the mobile terminal of this user is installed with the function of the icon ID "A" and the function of the icon ID "B", but is not installed with the function of the icon ID "C", and therefore, the icon of the icon ID "C" is displayed in gray-out form. Further, when the icon information includes an ID of a particular display position, for example, "0", the updating section 15 deletes an icon corresponding to the display position ID of the particular display position from the address book.

Further, the updating section 15 updates the address book with an icon downloaded from the icon server 32. More specifically, when the new function is updated in the mobile terminal of the user according to the function information but an icon corresponding to the function does not exist, the updating section 15 downloads the icon from the icon server 32. The updating section 15 updates the address book so as to display the downloaded icon in the predetermined display position.

The application control section 16 executes an application program created in application language (for example, Java (registered trademark) language) corresponding to directions of the control section 11. Further, the application control section 16 starts an application with the mobile communication center 3 as necessary.

FIG. 3 is a block diagram showing a schematic configuration of the function notifying server 31 as shown in FIG. 1. The function notifying server 31 is mainly comprised of a control section 311 that controls the entire apparatus, communication control section 312 that communicates with the mobile terminals 1A, 1B via the mobile communication network 2, icon information generating section 313 that generates the icon information based on the function information, terminal function database 314 that manages models of mobile terminals and functions available in the models, and application control section 315 that starts applications installed or downloaded in the apparatus.

The communication control section 312 receives the function information transmitted from the mobile terminal 1A in a call. Further, the communication control section 312 transmits the icon information generated based on the function information to the mobile terminal 1B.

The terminal function database 314 manages models of mobile terminals and functions available in the models, and has a management table as shown in FIG. 4. For example, F902iS is installed with functions of videophone, Deco-mail, Push Talk and Chaku-moji, and SO902i is installed with functions of videophone and Deco-mail.

The icon information generating section 313 generates the icon information from the function information managed in the terminal function database 314. In other words, the icon information generating section 313 generates the icon information as shown in FIG. 5 based on the function information. The icon information is, for example, information as shown in FIG. 5, and includes display positions (display IDs) in the address book, icons (icon IDs), and availability of function (availability IDs). For example, in FIG. 5, the function information indicates that the mobile terminal is installed with the function of videophone and the function of Deco-mail, and is not installed with the function of Push Talk, and the icon information is generated based on the function information. In other words, the icon information means that the icon of the icon ID "A" is displayed in the display position "1" of the address book, the icon of the icon ID "B" is displayed in the display position "2" of the address book, and that the icon of the icon ID "C" is displayed in the display position "3" of the address book, and further means that the mobile terminal of this user is installed with the function of the icon ID "A" and the function of the icon ID "B", but is not installed with the function of the icon ID "C".

Further, the icon information generating section 313 has the function of deleting an icon, while including the information of the function corresponding to the deleted icon in the icon information. In other words, when the service provider side sets no need of icon display on a particular function, the icon information generating section 313 generates the icon information with the icon corresponding to the set function deleted. By this means, it is possible to replace the icon of the function established in the user with an icon of a new function for the service provider to wish to advertise, and to effectively use the area for storing icons. Further, even when the icon is deleted, the icon information generating section 313 generates the icon information including the history of the deleted icon. For example, as described above, the deleted icon is provided with a specific display position ID "0", and included in the icon information (FIG. 11(b)). By this means, it is possible to leave the history of function display regarding the mobile terminal of each user, and the need is eliminated for managing the function display on each service provider side.

The application control section 315 executes an application program created in application language (for example, Java language) corresponding to directions of the control section 311. Further, when the function notifying server 31 receives the function information from the mobile terminal 1A, the application control section 315 starts an icon information generating application so as to generate the icon information based on the function information.

Figures 6, 7:
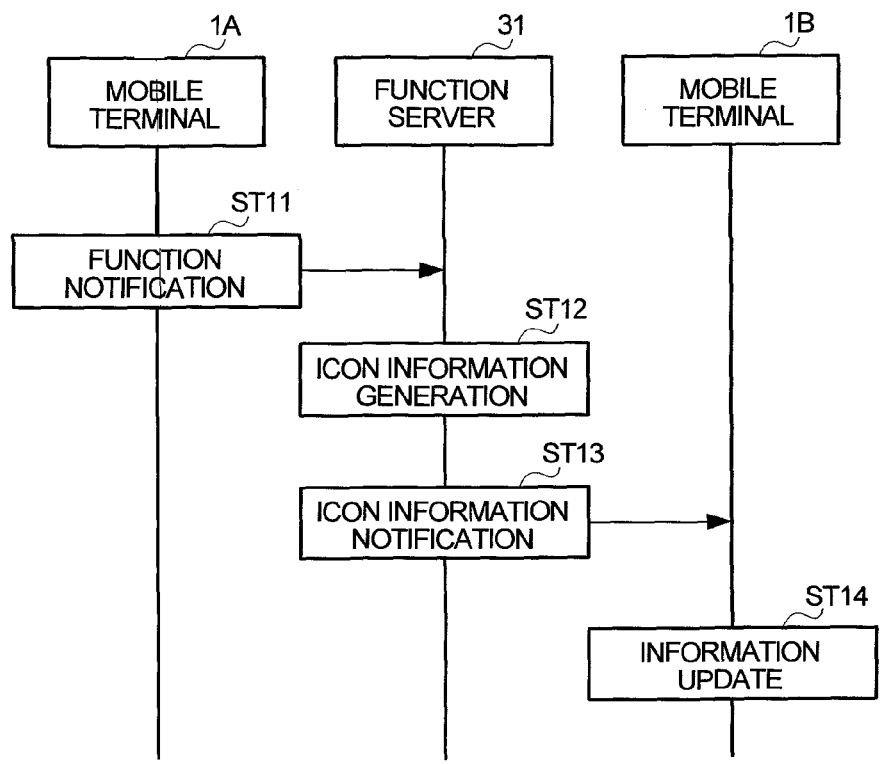
FIG. 6 is a diagram to explain icons managed in an icon server.
FIG. 7 is a sequence diagram to explain a function updating method according to the embodiment of the invention.

The icon server 32 manages various icons, and for example, manages the icons as shown in FIG. 6. In FIG. 6, the server 32 manages the icon of videophone of the icon ID "A", icon of Deco-mail of the icon ID "B", icon of Push Talk of the icon ID "C", and icon of Chaku-moji of the icon ID "D".

A function updating method according to this embodiment of the invention will specifically be described below in separate points of function update, icon download, and deletion of an unnecessary icon•addition of a new icon with reference to FIGS. 7 to 11. (Function update)

Figures 8A, 8B, 8C:
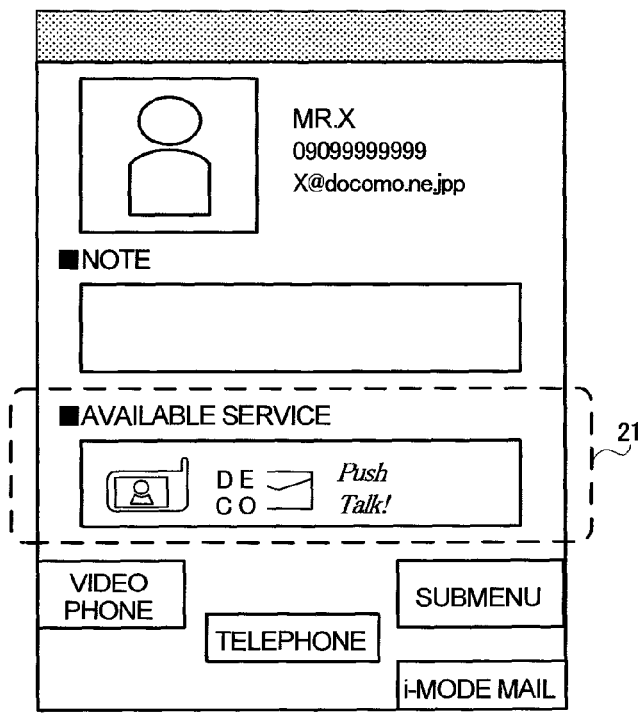
FIGS. 8(*a*) to 8(*c*) are diagrams to explain function updating in the function updating method according to the embodiment of the invention.
Figure 9:
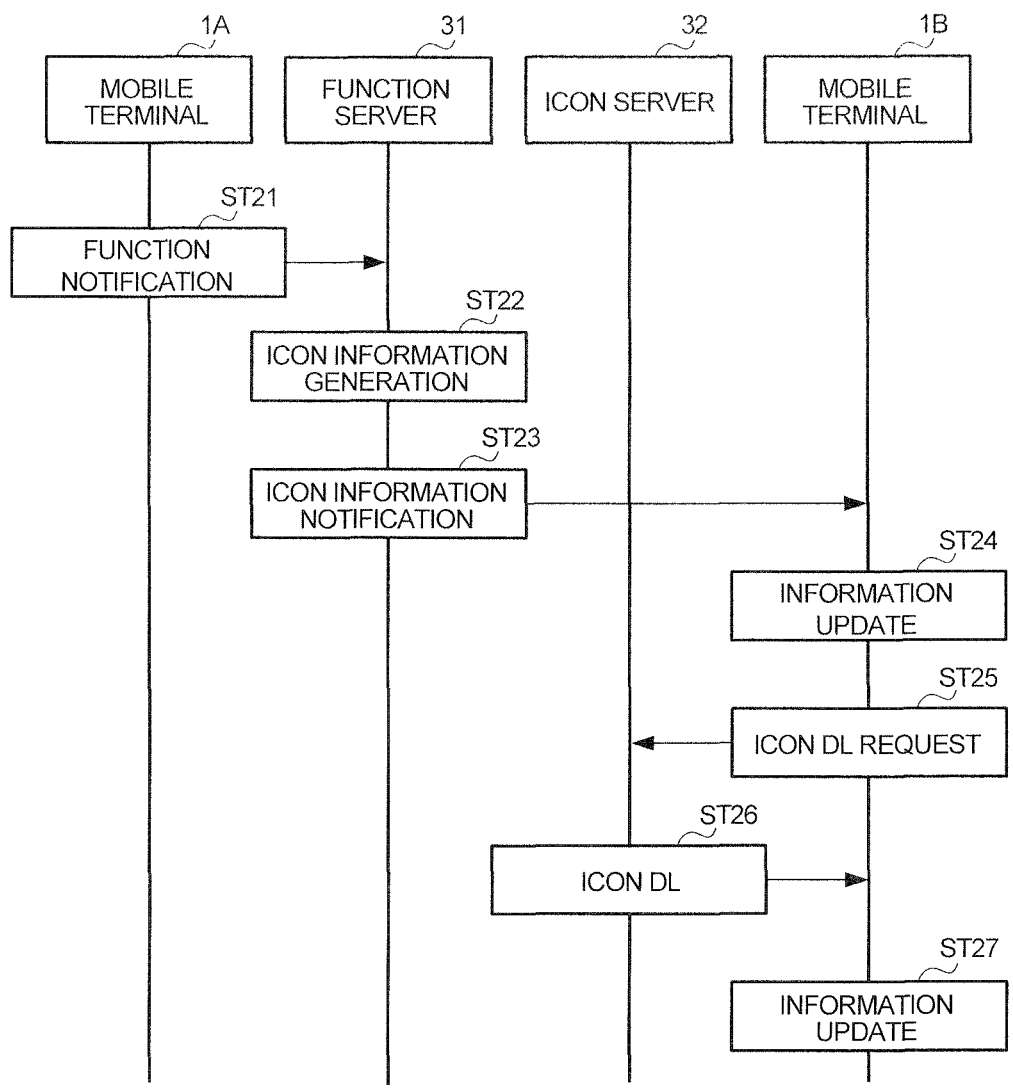
FIG. 9 is another sequence diagram to explain the function updating method according to the embodiment of the invention.

First, as shown in FIG. 8(a), as icons, the mobile terminal 1B is assumed to have the videophone (icon ID "A"), Deco-mail (icon ID "B"), and Push Talk (icon ID "C"). Then, the mobile terminal 1A is assumed to be installed with the function of videophone, and the function of Deco-mail. Further, the mobile terminals 1A and 1B are assumed to have four areas to display the icon.

In order for the user of the mobile terminal 1A to call the user of the mobile terminal 1B, when the mobile terminal 1A makes a call to the mobile terminal 1B, the mobile terminal 1A transmits the information (information indicative of the videophone function and Deco-mail function being installed) of functions available in the mobile terminal 1A to the function notifying server 31 from the communication control section 12 via the mobile communication network 2 (ST11). When the function notifying server 31 receives the function information from the mobile terminal 1A, the application control section 315 starts the icon information generating application, and generates the icon information based on the function information (ST12). As shown in FIG. 8(b), the icon information is to display the icon of the icon ID "A" of videophone in the display position "1" of the address book, display the icon of the icon ID "B" of Deco-mail in the display position "2" of the address book, and display the icon of the icon ID "C" of Push Talk in the display position "3" of the address book, and since the mobile terminal 1A is installed with the function of videophone and the function of Deco-mail without being installed with the function of Push Talk, the availability icon ID is at "1" on the icon ID "A" of videophone and the icon ID "B" of Deco-mail, while being set at "0" on the icon ID "C" of Push Talk.

The function notifying server 31 transmits thus obtained icon information to the mobile terminal 1B that is the communicating party of the mobile terminal 1A from the communication control section 312 via the mobile communication network 2 (ST13). When the mobile terminal 1B receives the icon information, the updating section 15 updates the address book with the icon information (ST14). The display section 13 displays the icons in the icon display area 21 in the address book according to the icon information. In other words, as shown in FIG. 8(c), the section 13 displays the icon "A" of videophone in the display position "1" to be available, the icon "B" of Deco-mail in the display position "2" to be available, and the icon "C" of Push Talk in the display position "3" not to be available (gray-out display). Meanwhile, anything is not displayed in the display position "4". (Icon download)

First, as shown in FIG. 8(a), as icons, the mobile terminal 1B is assumed to have the videophone (icon ID "A"), Deco-mail (icon ID "B"), and Push Talk (icon ID "C"). Then, the mobile terminal 1A is assumed to be installed with the function of videophone, the function of Deco-mail, the function of Push Talk, and the function of Chaku-moji. Further, the mobile terminals 1A and 1B are assumed to have four areas to display the icon.

In order for the user of the mobile terminal 1A to call the user of the mobile terminal 1B, when the mobile terminal 1A makes a call to the mobile terminal 1B, the mobile terminal 1A transmits the information (information indicative of the videophone function, Deco-mail function, Push Talk function and Chaku-moji function being installed) of functions available in the mobile terminal 1A to the function notifying server 31 from the communication control section 12 via the mobile communication network 2 (ST21). When the function notifying server 31 receives the function information from the mobile terminal 1A, the application control section 315 starts the icon information generating application, and generates the icon information based on the function information (ST22). As shown in FIG. 10(a), the icon information is to display the icon of the icon ID "A" of videophone in the display position "1" of the address book, display the icon of the icon ID "B" of Deco-mail in the display position "2" of the address book, display the icon of the icon ID "C" of Push Talk in the display position "3" of the address book, and display the icon of the icon ID "D" of Chaku-moji in the display position "4" of the address book, and since the mobile terminal 1A is installed with the videophone function, Deco-mail function, Push Talk function, and Chaku-moji function, the availability icon ID is set at "1" on the icon ID "A" of videophone, the icon ID "B" of Deco-mail, the icon ID "C" of Push Talk, and the icon ID "D" of Chaku-moji.

The function notifying server 31 transmits thus obtained icon information to the mobile terminal 1B that is the communicating party of the mobile terminal 1A from the communication control section 312 via the mobile communication network 2 (ST23). When the mobile terminal 1B receives the icon information, the updating section 15 updates the address book with the icon information (ST24). In this case, in the mobile terminal 1B, as shown in FIG. 10(b), the icons are displayed in an icon display area 22 on the screen for incoming calls. In other words, the icon "A" of videophone is displayed in the display position "1" to be available, the icon "B" of Deco-mail is displayed in the display position "2" to be available, and the icon "C" of Push Talk is displayed in the display position "3" to be available. Meanwhile, since the mobile terminal 1B does not have the icon of Chaku-moji, "?" is displayed in the display position "4".

In such a mobile terminal 1B, after the call, the terminal 1B downloads the icon of Chaku-moji from the icon server 32. In other words, when the mobile terminal 1B requests a needed icon (that corresponds to the function installed in the mobile terminal 1A of the communicating party and that the mobile terminal 1B does not have), (ST25), the application control section 16 starts an icon download application, and downloads the required icon from the icon server 32 (ST26).

When the mobile terminal 1B receives the icon, the updating section 15 updates the address book with the icon (ST27). By this means, as shown in FIG. 10(c), as icons, the mobile terminal 1B has the icons of videophone (icon ID "A"), Deco-mail (icon ID "B"), Push Talk (icon ID "C"), and Chaku-moji (icon ID "D"). In the address book, the icons are displayed in the icon display area 21. In other words, as shown in FIG. 10(d), the icon "A" of videophone is displayed in the display position "1" to be available, the icon "B" of Deco-mail is displayed in the display position "2" to be available, the icon "C" of Push Talk is displayed in the display position "3" to be available, and the icon "D" of Chaku-moji is displayed in the display position "4" to be available. (Deletion of an unnecessary icon•Addition of a new icon)

First, as shown in FIG. 10(c), as icons, the mobile terminal 1B is assumed to have the icons of videophone, Deco-mail, Push Talk and Chaku-moji. In this case, when the service provider judges that the videophone has become widespread among users and sets the icon of videophone to delete, in the function notifying server 31, upon receiving the function information, the icon information generating section 313 deletes the icon of videophone and generates the icon information. At this point, as shown in FIG. 11(b), the icon information generating section 313 leaves the history of the deleted icon, and generates the icon information with an area of an icon of a new function provided. By this means, as shown in FIG. 11(a), as icons, the mobile terminal 1B has the icons of Deco-mail, Push Talk, and Chaku-moji.

The function notifying server 31 transmits thus obtained icon information to the mobile terminal 1B that is the communicating party of the mobile terminal 1A from the communication control section 312 via the mobile communication network 2. When the mobile terminal 1B receives the icon information, the updating section 15 updates the address book with the icon information. In this case, in the mobile terminal 1B, as shown in FIG. 11(c), the icons are displayed in the icon display area 22 on the screen for incoming calls. In other words, the icon "B" of Deco-mail is displayed in the display position "1" to be available, the icon "C" of Push Talk is displayed in the display position "2" to be available, and the icon "C" of Chaku-moji is displayed in the display position "3" to be available. Meanwhile, since the mobile terminal 1B does not have the icon of the new function, "?" is displayed in the display position "4".

Thus, according to the invention, when the mobile terminal 1A makes a call to the mobile terminal 1B, the mobile terminal 1A transmits information of functions available in the mobile terminal 1A to the function notifying server 31, the function notifying server 31 generates icon information based on the function information, and transmits the icon information to the mobile terminal 1B, and the mobile terminal 1B updates the address book with the icon information. Meanwhile, when the mobile terminal 1B does not have the icon corresponding to the updated function, the mobile terminal 1B downloads the icon from the icon server 32. Therefore, it is possible to get a user to recognize what functions are installed in the mobile terminal of the communicating party, by automatically notifying the functions in the mobile terminal and updating the address book with the functions.

The present invention is not limited to the above-mentioned embodiment, and is capable of being carried into practice with various modifications thereof. For example, this embodiment describes the case where the mobile terminal 1A transmits the function information to the function notifying server 31, and the icon information is generated based on the function information. In this case, the terminal function database 314 is not indispensable, and it is enough that the application control section 315 starts the icon information generating application so as to generate the icon information when the function notifying server 31 receives the function information. The invention is not limited thereto, and such a constitution may be provided that the mobile terminal 1A transmits the model information to the function notifying server 31, and when the function notifying server 31 receives the model information, the application control section 315 starts the icon information generating application, refers to the management table of the terminal function database 314 as shown in FIG. 4 using the model information, and extracts the function information corresponding to the model so as to generate the icon information based on the function information.

Further, the above-mentioned embodiment describes the case that the icon display area is capable of displaying four icons, but the invention is not limited thereto, and is applicable to the case that the icon display area is capable of displaying three or less icons, or five or more icons. Furthermore, as functions installed in the mobile terminal, the case is described that the functions are videophone, Deco-mail, Push Talk and Chaku-moji, but the invention is not limited thereto, and is applicable to other functions.

Moreover, numeric values, processing sections and processing procedures in the above-mentioned explanation are capable of being carried into practice with modifications thereof as appropriate without departing from the scope of the invention. Further, the invention is capable of being carried into practice with modifications thereof as appropriate without departing from the scope of the invention.

According to this embodiment, when the first mobile terminal apparatus makes a call to the second mobile terminal apparatus, the first mobile terminal apparatus transmits information of functions available in the first mobile terminal apparatus to the server apparatus, the server apparatus generates function display image information based on the information of functions, and transmits the function display image information to the second mobile terminal apparatus, the second mobile terminal apparatus updates the address book with the function display image information, and it is thereby possible to get the user to recognize what functions are installed in the mobile terminal of the communicating party, by automatically notifying the functions in the mobile terminal and updating the address book with the functions.

INDUSTRIAL APPLICABILITY

The function updating system and function updating method according to the invention is capable of being used in systems where mobile terminals having various functions communicate with one another.

The invention claimed is:
1. A function updating system comprising:
a first mobile terminal apparatus having a communication control section that transmits information of functions available in the first mobile terminal apparatus in calling, and an updating section that updates an address book with information of functions available in an apparatus of a communicating party; and
a server apparatus having an information generating section that generates function display image information based on the information of functions, and a communication control section that transmits the function display image information to a second mobile terminal apparatus;
a function display image server apparatus that manages various function display images,
wherein the communication control section of the second mobile terminal apparatus downloads a function display image corresponding to a function updated in the address book from the function display image server apparatus when the second mobile terminal apparatus does not have the function display image corresponding to the function updated in the address book.
2. The function updating system according to claim 1, wherein the information generating section has a function of deleting a function display image, while including information of a deleted function in the function display image information.
3. A function updating method comprising the steps of:
transmitting information of functions available in a first mobile terminal apparatus to a server apparatus when the first mobile terminal apparatus makes a call to a second mobile terminal apparatus;
generating, in the server apparatus, function display image information based on the information of functions;
transmitting, in the server apparatus, the function display image information to the second mobile terminal apparatus; and
updating, in the second mobile terminal apparatus, an address book with the function display image information,
wherein the second mobile terminal apparatus further has the step of making a request for download of a function display image corresponding to a function updated in the address book to a function display image server apparatus when the second mobile terminal apparatus does not have the function display image corresponding to the function updated in the address book, and the server apparatus downloads the function display image corresponding to the function updated in second mobile terminal apparatus in response to the request.
4. The function updating method according to claim 3, wherein in the step of generating the function display image information, a function display image is deleted, while information of a deleted function is included in the function display image information.

* * * * *